(12) United States Patent
Skaare

(10) Patent No.: US 12,331,723 B2
(45) Date of Patent: Jun. 17, 2025

(54) FLOATING WIND TURBINE CONTROL BELOW RATED WIND SPEED

(71) Applicant: EQUINOR ENERGY AS, Stavanger (NO)

(72) Inventor: Bjørn Skaare, Trondheim (NO)

(73) Assignee: EQUINOR ENERGY AS, Stavanger (NO)

( * ) Notice: Subject to any disclaimer, the term of this patent is extended or adjusted under 35 U.S.C. 154(b) by 10 days.

(21) Appl. No.: 18/258,590

(22) PCT Filed: Dec. 15, 2021

(86) PCT No.: PCT/NO2021/050266
§ 371 (c)(1),
(2) Date: Jun. 21, 2023

(87) PCT Pub. No.: WO2022/139586
PCT Pub. Date: Jun. 30, 2022

(65) Prior Publication Data
US 2024/0183333 A1 Jun. 6, 2024

(30) Foreign Application Priority Data
Dec. 22, 2020 (GB) ...................................... 2020428

(51) Int. Cl.
*F03D 7/02* (2006.01)
*F03D 7/04* (2006.01)
*F03D 17/00* (2016.01)

(52) U.S. Cl.
CPC ........... *F03D 7/0224* (2013.01); *F03D 7/042* (2013.01); *F03D 17/006* (2023.08)

(58) Field of Classification Search
CPC ...... F03D 7/0224; F03D 7/0296; F03D 13/25; F05B 2240/93; F05B 2260/96
See application file for complete search history.

(56) References Cited

U.S. PATENT DOCUMENTS 7,456,515 B2 * 11/2008 Nielsen ................... F03D 13/25
290/55
8,186,949 B2 * 5/2012 Nielsen ................. F03D 7/0296
416/37

(Continued)

FOREIGN PATENT DOCUMENTS

WO  2010076557 A1  7/2010
WO  2013065323 A1  5/2013

(Continued)

OTHER PUBLICATIONS

International Search Report and Written Opinion, PCT/NO2021/050266, dated Feb. 16, 2022 (9 pp.).

(Continued)

*Primary Examiner* — Justin D Seabe
(74) *Attorney, Agent, or Firm* — Eversheds Sutherland (US) LLP

(57) ABSTRACT

A motion controller for a floating wind turbine including a number of rotor blades is provided. The motion controller is arranged to adjust the blade pitch of each rotor blade when the floating wind turbine is operating in winds below the rated wind speed so as to create a net force that damps a surge motion of the floating wind turbine. Also provided is a method of damping the motion of a floating wind turbine and a wind turbine having such a motion controller.

16 Claims, 4 Drawing Sheets

(56) References Cited

U.S. PATENT DOCUMENTS

| | | | |
|---|---|---|---|
| 8,487,464 B2* | 7/2013 | Skaare | F03D 7/0296 |
| | | | 290/44 |
| 9,702,344 B2* | 7/2017 | Skaare | F03D 13/25 |
| 9,879,654 B2* | 1/2018 | Peiffer | B63B 39/03 |
| 10,087,913 B2* | 10/2018 | Nielsen | F03D 13/25 |
| 2018/0119672 A1 | 5/2018 | Peiffer et al. | |

FOREIGN PATENT DOCUMENTS

| | | |
|---|---|---|
| WO | 2014096419 A1 | 6/2014 |
| WO | 2018101833 A1 | 6/2018 |
| WO | 2019/114897 A1 | 6/2019 |

OTHER PUBLICATIONS

Examination Report, GB2020428.5, dated Jan. 17, 20212 (4 pp.).
Combined Search and Examination Report, GB2020428.5, dated May 24, 2021 (6 pp.).
Extended European Search Report, EP 21911639.9, dated Oct. 22, 2024 (7 pp.).

* cited by examiner

FLOATING WIND TURBINE CONTROL BELOW RATED WIND SPEED

TECHNICAL FIELD

The present invention relates to a motion controller for a floating wind turbine, a method of damping the motion of a floating wind turbine and a wind turbine having such a motion controller. More specifically, it relates to damping surge motion of the floating wind turbine when the wind turbine is operating in wind speeds below rated wind speed.

BACKGROUND OF THE INVENTION

A wind turbine installation is usually formed of a support structure comprising an elongate tower, with a nacelle having a rotor mounted thereto attached to the upper end of the support structure. The rotor comprises a plurality of rotor blades. The generator and its associated electronics are usually located in the nacelle.

A wind turbine installation may be a fixed-base wind turbine that is fixed either to the land or the sea bed, or a floating wind turbine. One example floating wind turbine comprises a conventional wind turbine structure mounted on a buoyant base such as a platform or raft-like structure. Another example is a "spar buoy" type structure. Such a structure is formed of a vertically elongate buoyant support structure with a rotor mounted on the top. The support structure can be a unitary structure or it can be an elongate sub-structure with a standard tower mounted thereon.

Floating wind turbine installations may be moored to the sea bed via one or more mooring lines with anchors or attached to the sea bed, or with one or more articulated (hinged) legs, for example, in order to hold them at their desired installation sites.

Fixed foundation wind turbines are rigidly secured to a landmass at one end. When acted on by forces, such as those caused by changes in wind speed or direction, a fixed foundation wind turbine acts as a cantilever and the tower vibrates as it bends slightly. These motions may have small amplitudes but high frequencies, i.e. they can be small, fast motions. In contrast, floating wind turbines are not rigidly secured to a land mass and as a result the whole elongate structure can move in a rigid body manner, in addition to the same types of tower vibrations as those experienced by fixed foundation turbines.

When a floating wind turbine is acted on by forces, such as those caused by changes in wind speed or direction or those caused by waves, the whole structure may move about in the water. These motions may have large amplitudes but relatively low frequencies, i.e. they can be large, slow motions. The motions are low frequency in the sense that they are much lower than the rotational frequency of the turbine/rotor itself. These are rigid body motions (rather than bending motions). The motions experienced are "heave" which is a linear vertical (up/down) motion (e.g. in a vertical direction perpendicular to the rotor axis), "sway" which is a linear lateral (side-to-side) motion (e.g. in a horizontal direction perpendicular to the rotor axis), "surge" which is a linear longitudinal (front/back) motion (e.g. in a direction parallel to the rotor axis), "roll" which is a rotation of the body about its horizontal (front/back) axis (e.g. about the rotor axis), "pitch" which is a rotation of the body about its transverse (side-to-side) axis (e.g. about a horizontal axis that is perpendicular to the rotor axis), and "yaw" which is a rotation of the body about its vertical axis (e.g. about a vertical axis that is perpendicular to the rotor axis).

In certain circumstances, these motions can reduce the overall efficiency or power output of the turbine and, moreover, can create excessive structural stresses which can damage or weaken the wind turbine structure and/or associated mooring or could cause instability of the wind turbine. There is therefore a desire to control or damp these rigid body motions.

In conventional wind turbines, the pitch of the rotor blades is controlled in order to regulate the power output. The power output generated by the turbine is maximised at a particular wind speed, known as the rated wind speed. When operating in winds below the rated wind speed, the blade pitch is kept approximately constant at an angle that provides maximum power output. In contrast, when operating above the rated wind speed, the blade pitch is adjusted in order to produce a constant power output and prevent excessively high power outputs that could damage the generator and/or its associated electronics. This constant power output may be referred to as the rated power of the wind turbine. In this regime, the rotor may be controlled so that it rotates at a constant speed. This may be referred to as a desired and/or target rotor speed.

The wind turbine may also have a cut-out wind speed, which is a wind speed at which the turbine shuts down to avoid damage.

In order to produce maximum power output when operating below the rated wind speed, the blade pitch is set in order to produce an optimum tip speed ratio. The tip speed ratio, λ, is defined as the speed at which the outer tips of the rotor blades are moving divided by the wind speed and is given by:

$$\lambda = \frac{\omega R}{u}$$

where ω is the angular frequency of the rotor (in radians per second), R is the radius of the rotor and μ is the wind speed. An optimum tip speed ratio for maximum power output is around 8 to 10 and in most wind turbines this will in practice give a power coefficient $C_p$ of around 0.45 (0.59 being the theoretical maximum), where the power P is defined as:

$$P = \frac{1}{2}\rho A C_p(\lambda, \beta) u^3$$

where ρ is the air density, A is the area swept by the rotor blades and $C_p$ is the power coefficient, which is determined by tip speed ratio λ and the blade pitch B.

When operating below the rated wind speed, as the blade pitch is kept approximately constant, the thrust acting on the rotor (in the direction of its axis) increases with the wind speed. Thrust is approximately proportional to the square of the wind speed relative to the rotor. As a result, axial motions e.g. surge motions, which increase the relative wind speed, may be damped.

In contrast, when operating above the rated wind speed, the blade pitch is adjusted such that the thrust on the rotor decreases with increasing wind speed in order to produce a constant power output. As the wind speed increases, the blade pitch is increased, i.e. made more parallel to the wind direction, in order to reduce the thrust acting upon it and thereby maintain constant power. However, as the thrust is reduced, the damping force acting on the wind turbine's vibrations is also reduced and can become negative. In other words, the oscillations can be exacerbated and their amplitude increases. This then results in a further change in the relative wind speed and a further adjustment to the blade pitch, making the amplitude of the oscillations even larger. The opposite applies when the wind turbine is moving away from the wind, resulting in a further exacerbation of the oscillations. This is known as negative damping and can cause the floating wind turbine to become seriously unstable.

WO 2007/053031 and WO 2010/076557 describe wind turbine controllers which are designed to counteract the problem of negative damping which occurs above rated wind speed, and to reduce resonant low frequency motion in the axial direction. This is achieved by collectively adjusting the pitch of the blades to create a damping and/or restoring force in the axial direction.

SUMMARY OF THE INVENTION

In a first aspect, the invention provides a motion controller for a floating wind turbine comprising a plurality of rotor blades, wherein the motion controller is arranged to adjust the blade pitch of each rotor blade when the floating wind turbine is operating in winds below the rated wind speed so as to create a net force that damps a surge motion of the floating wind turbine.

The inventors of the present invention have realised that some axial motions, and particularly surge motion, can still be significant when the wind turbine is operating below rated wind speed, despite the natural positive damping that occurs as described above. They have found that the natural overall damping level can be relatively low for operation below the rated wind speed, particularly at the natural frequency in surge. The present invention therefore provides a controller that is configured to actively damp surge motion when the wind turbine is operating below rated wind speed, which enhances the effect of natural aerodynamic damping.

The previously known motion controllers for damping the axial motions of the wind turbine utilise a collective pitch adjustment of the turbine blades when the wind turbine is operating above rated wind speed, where negative damping is a concern. These controllers typically include a blade pitch control loop which attempts to maintain a desired rotor speed by adjusting the blade pitch. This is done based on the rotor speed error, which is the deviation from the desired (set point) rotor speed. However, negative damping is not a concern below rated wind speeds, because blade pitch adjustment (which causes negative damping) does not typically occur in that operating region. Moreover, in wind turbines operating below the rated wind speed, the rotor speed is not maintained at a constant desired value, and so the blade pitch is not adjusted based on a rotor speed error. Therefore, the known controller algorithms used to avoid negative damping above rated wind speed are not suitable for use when the wind turbine is operating below the rated wind speed.

The present invention allows for the effective damping of surge motion of the floating wind turbine while the turbine is operating below the rated wind speed. This is achieved by adjusting the blade pitch of each rotor blade to create a net force that damps the surge motion.

The controller of the invention may therefore be used to actively damp the surge motions of a floating wind turbine which could otherwise damage parts of the structure such as the mooring lines or other anchoring arrangements, even when the wind speeds are below rated wind speed when natural aerodynamic damping would be expected to prevent significant surge motions.

The controller may be particularly useful for floating wind turbines in locations with a mild wave climate. This is because in these locations wind induced loads may dominate overall mooring loads. Thus the present invention may for example allow the reduction of excessive loads on a mooring system of the floating wind turbine, thereby extending the lifetime of the mooring system in addition to reducing loads on the wind turbine structure itself.

The problem of fatigue in the mooring system and of surge motion experienced by the floating wind turbines is particularly apparent with catenary chain mooring systems, but is also experienced to an extent by rope mooring systems (which typically use polyester ropes) as well. The controller may therefore be useful in conjunction with various mooring systems including these two examples, and particularly when the floating wind turbine is moored (e.g. to a waterbed) via a chain mooring system. As such, there may be provided a system comprising a floating wind turbine and a mooring system (e.g. a chain or rope mooring system) for mooring the floating wind turbine, the floating wind turbine comprising a motion controller as described herein.

Another particular application of the present invention is shared mooring systems, whereby multiple floating wind turbines share moorings in a grid or networked arrangement. In such shared mooring systems the problems of fatigue and surge motion may be more pronounced and hence the invention may find particular application here. As such, there may be provided a system comprising a plurality of floating wind turbines arranged in a network (or grid) arrangement via a shared mooring system, each floating wind turbine comprising a motion controller as described herein.

The surge motion damping may be achieved by individually or collectively pitching the rotor blades so as to create a force in the axial direction (i.e. axial relative to the axis of the rotor) which counteracts the axial surge velocity and/or displacement. This may be achieved by dynamically adjusting the pitch of the blades so that an additional blade angle is provided based on the surge motion, e.g. based on the surge velocity and/or the displacement of the floating wind turbine in the direction of the surge motion. For example, the blade pitch may be adjusted continuously and gradually whilst the floating wind turbine undergoes surge motion so that a gradually increasing and then decreasing blade pitch is provided based on the surge motion oscillations. By varying the amplitude of the additional blade pitch angle and thus varying the force with a frequency equal to the natural frequency of the surge motion a net damping effect can be obtained.

The surge motions of floating wind turbines have natural periods which are long compared to the period of rotor rotation. This means that the surge motion may be accurately controlled by appropriate amplitude, frequency and phasing of the blade pitching.

The surge motion may be in a specific frequency range. The frequency range may be about 0.004 to 0.017 Hz, or optionally within the range of about 0.007 to 0.009 Hz. This frequency range may pertain to any motions (or axial motions) of the floating wind turbine that have a natural or driven frequency within this range. The motions of the floating wind turbine that occur within these ranges may be dominated by surge motions, but may also include other types of motions. The natural period of surge motions may be in the range of about 60 to 250 seconds, or optionally within the range of about 110 to 140 seconds, or optionally about 125 seconds. These surge motions may be caused by changes in wind speed which excite the natural surge frequency of a wind turbine and may be more likely to occur in calmer waters.

The controller is for damping and/or controlling surge motion of the floating wind turbine. Thus the controller may be referred to as a motion controller and/or a floating wind turbine motion controller. The controller is also for controlling a blade pitch of one or more of the plurality of rotor blades, thus the controller may be referred to as a blade pitch controller.

The controller is preferably arranged to adjust the blade pitch of each rotor blade with a phase relative to the floating wind turbine surge motion velocity so as to provide a damping force.

Additionally, or alternatively, the controller is arranged to adjust the blade pitch of each rotor blade with a phase relative to the floating wind turbine surge motion displacement so as to provide a restoring force.

By damping force it is meant a force which opposes the surge motion velocity, as opposed to a restoring force which acts to oppose the surge motion excursion (displacement).

The phase of the rotor blade pitch adjustment relative to the surge motion velocity can be varied so that the force is either in phase with the surge motion velocity to create a damping force or in phase with the surge motion excursion (displacement) to create a restoring force. The controller may be tuned to obtain an optimum balance between damping and restoring forces.

The controller may calculate or determine the blade pitch adjustment for damping the surge motion based on an input of the surge motion.

The input of the surge motion may be a surge velocity. Thus the blade pitch adjustment for damping the surge motion may be based on the velocity of the surge motion. The velocity may be a measured or estimated surge velocity. The surge velocity estimate could be an estimate based on a motion, velocity and/or acceleration measurement.

The input of the surge motion may be measured and/or estimated using the output from one or more sensors. The sensor(s) may be configured to provide an output indicative of surge motions in the surge motion frequency range. The one or more sensors may comprise different types of sensors.

The input of the surge motion may be obtained from the output from a motion sensor (e.g. velocity sensor and/or accelerometer etc.), i.e. the sensor may be a motion sensor. The sensor may be a motion reference unit (MRU). The sensor may be for measuring rigid body surge motions in the relevant frequency range. The relevant frequency range may be a frequency range which is expected to include surge motions. The motion sensor for detecting motion (e.g. surge motion) of the wind turbine may be positioned at any point on the wind turbine. For example, the sensor may be placed at the base of the wind turbine tower, in the nacelle of the wind turbine, or at any point along the wind turbine tower.

Additionally or alternatively, the input of the surge motion may be obtained from the output from a global positioning system (GPS) such as a differential global positioning system (DGPS), i.e. the sensor may be a GPS (or a DGPS). The global positioning system may be used to measure the surge motions of the wind turbine, e.g. surge motions in the relevant frequency range.

Any other appropriate sensing means may be used to measure the surge motions.

When the surge motion velocity measurement or estimation is input it is preferable for the controller to use a low pass filter on the velocity input. This ensures that the controller can act on the surge motions within a specific frequency range, for example at or near the resonant frequency of the surge motions. In relation to surge motions it is desired to provide damping at the natural frequency of the surge motion and to consider higher frequencies such as wave frequencies as undesired disturbance.

When the wind turbine is operating below rated wind speed, it is preferable to maximise power extraction as well as provide damping of the surge motion. The controller therefore preferably controls the blade pitch based on a blade angle that maximises the power extraction, and an additional blade pitch adjustment to take into account the surge motions.

Thus, in a preferred embodiment the controller is arranged to calculate an original blade pitch for the plurality of rotor blades, calculate an additional blade pitch adjustment for the plurality of rotor blades to counteract a surge motion of the floating wind turbine, and combine the original blade pitch and the additional blade pitch adjustment to obtain a total blade pitch adjustment to cause damping of the surge motion. The controller preferably adjusts the blade pitch of each rotor blade based on the total blade pitch adjustment.

In the preferred embodiment the controller comprises a standard controller for determining an original blade pitch signal and an active damping controller for determining an additional blade pitch adjustment signal.

The original blade pitch may be the optimum blade pitch for maximum power extraction below rated wind speed, e.g. a pitch that produces an optimum tip speed ratio. This may be a constant or substantially constant value. The original blade pitch may not be determined based on surge motion of the floating wind turbine, i.e. the original blade pitch may be independent of surge motion. The additional blade pitch adjustment is preferably based on the surge motion. Thus the total blade pitch adjustment may include a component that is independent of the surge motion (e.g. a constant or substantially constant component), and a component that varies based on surge motion.

The active damping controller may comprise a control loop. The control loop may be for calculating and/or determining the additional blade pitch adjustment signal for damping the surge motion.

The control loop may include filtering and/or parameter settings that are tailored and/or optimised for the surge motion.

The control loop may receive the input of the surge motion, e.g. an input from a motion sensor provided on the floating wind turbine structure and/or an input from or based on data from a differential global positioning system.

The output of the control loop may be the additional blade pitch adjustment signal for damping the surge motion.

The controller may be arranged to control the blade pitch of one or more of the plurality of rotor blades based on the additional blade pitch adjustment signal from the active damping controller. The controller may also be arranged to control the blade pitch of one or more of the plurality of rotor blades based on the original blade pitch signal.

The active damping controller may comprise a signal processing unit. The signal processing unit may be configured to take raw measurements from the sensor(s) and apply one or more estimation techniques to estimate the velocity of the surge motion of the wind turbine. The estimation techniques may comprise Kalman filtering. For example, a measurement from a differential global positioning system may be combined with estimation techniques, such as Kalman filtering, to estimate the motion, e.g. surge velocity.

The active damping controller may comprise a filter. The filter may be configured to filter out changes in the velocity with frequencies above and/or below the natural surge frequency of the rigid body motions. For example, the filter may filter out frequencies above 0.017 Hz and/or below 0.004 Hz. The filter may be a low pass filter. The low pass filter may have a cut-off frequency in the range of about 0.004 to 0.017 Hz, and preferably in the range of about 0.007 to 0.009 Hz. Although any suitable filer may be employed, the filter is preferably a second or third order Butterworth low pass filter. Such filters may be configured to ensure that only oscillations with the desired frequencies are actively damped.

As discussed above, the controller may comprise a standard controller in addition to the active damping controller. The standard controller may determine or receive an original blade pitch signal, which may be a signal corresponding to a desired blade pitch when surge motions of the floating wind turbine are not taken into account. The standard controller is preferably also for receiving the additional blade pitch adjustment signal from the active damping controller.

The controller may be configured to combine the original blade pitch signal and the additional blade pitch adjustment signal to create a total blade pitch adjustment signal. The controller may be configured to adjust the blade pitch of one or more of the plurality of blades based on the total blade pitch adjustment signal. The total blade pitch adjustment may damp the surge motion while maximising power output when the wind turbine is operating in wind speeds below rated wind speed.

The total blade pitch adjustment may be for controlling the pitch of the rotor blades collectively. Thus the controller may be for providing collective blade pitch control.

The blade pitch adjustment may cause the rotor speed to change. The blade pitch adjustment may cause an optimum rotor speed whilst providing forces to damp the surge motion.

The control loop (i.e. a control law) of the active damping controller may calculate the additional blade pitch adjustment signal $\beta_{ref2}$ for damping the surge motion. The additional blade pitch adjustment signal may be calculated based on the measured or estimated velocity of the surge motion $\dot{x}_s$, a controller gain $K_s$ and a filter, e.g. $h_s(s)$.

The additional blade pitch adjustment is preferably proportional (i.e. directly proportional) to the measured or estimated velocity of the surge motion $\dot{x}_s$.

As such, the control law may be written in the form:

$\beta_{ref2} = h_s(s) K_s \dot{x}_s$ where $h_s(s)$ may be a second order low pass filter. The filter may have a Laplace form. $h_s(s)$ may be a transfer function. In one example, $h_s(s)$ may be as follows:

$$h_s(s) = \frac{\omega_c^2}{\omega_c^2 + \sqrt{2}\omega_c s + s^2}$$

where, s may be the Laplace variable and $\omega_c$ may be the low pass filter frequency. $\omega_c$ may be inversely proportional to the time period of the surge motion. As such, $\omega_c$ may be expressed as:

$$\omega_c = \frac{2\pi}{T} \text{rad}/s$$

where T is the time period of the surge oscillation.

T may be in the range of about 60 to 250 seconds, or optionally within the range of about 110 to 140 seconds, for example about 125 seconds.

The controller gain and/or the low pass filter frequency may be suitable for the surge motion. The low pass filter frequency may be set according to the surge motion frequency range.

$\dot{x}_s$ may be measured and/or estimated using the output from different sensors (as discussed above).

$\beta_{ref2}$ may be combined with an original blade pitch signal $\beta_{ref1}$ to provide the total blade pitch adjustment signal $\beta_{ref}$. In other words, $\beta_{ref} = \beta_{ref1} + \beta_{ref2}$ Since it includes $\beta_{ref2}$, the total blade pitch adjustment signal results in the surge motion being damped.

As discussed above, $\beta_{ref2}$ may be proportional to the surge velocity, and so the total blade pitch adjustment signal may also be proportional to the surge velocity.

The controller is for controlling the floating wind turbine when the wind speed is below rated wind speed. The controller is thus for controlling the floating wind turbine when the wind turbine is operating below rated power. The controller may also be for controlling the floating wind turbine when the wind speed is above rated wind speed, i.e. the controller may not only be for use below rated wind speed.

The floating wind turbine may be a spar buoy-type floating wind turbine.

The floating wind turbine may be secured to the ocean floor through the use of a mooring system such as mooring lines and/or one or more articulated legs. Alternatively, the floating wind turbine may be a semi-submersible type floating wind turbine or any other kind of floating wind turbine.

The floating wind turbine may comprise the one or more sensors.

In a second aspect the present invention provides a floating wind turbine comprising a rotor with a plurality of rotor blades, and a motion controller arranged to adjust the blade pitch of each rotor blade when the floating wind turbine is operating in winds below the rated wind speed so as to create a net force that damps a surge motion of the floating wind turbine.

The floating wind turbine of the second aspect may comprise a controller in accordance with the first aspect.

The invention also extends to a corresponding control method. Thus, in a third aspect, the invention provides a method of controlling a floating wind turbine comprising a plurality of rotor blades, the method comprising: adjusting the blade pitch of each rotor blade when the wind turbine is operating in wind speeds below the rated wind speed so as to create a net force that damps a surge motion of the floating wind turbine.

The method preferably incorporates the optional and preferable features discussed above in relation to the first aspect of the invention.

The method of the third aspect may be performed using the controller of the first aspect and/or the floating wind turbine of the second aspect.

The controller of the first aspect and/or the floating wind turbine of the second aspect may be configured to perform the method of the third aspect.

As will be apparent to a person skilled in the art, the controller will normally be provided in the form of software. Thus the controller comprises a processor for running this software. The processors could be microprocessors, for example.

The present invention also relates to a software product comprising instructions which when executed by a processor cause the processor to adjust the blade pitch of each rotor blade when the wind turbine is operating in wind speeds below the rated wind speed so as to create a net force that damps a surge motion of the floating wind turbine.

Preferably the software product is a physical data carrier. Alternatively or in addition, the software product could be provided in the form of instructions transmitted over a network, such as downloaded over the Internet, for example.

The invention may be an additional controller or additional software. This may be arranged to perform the method or at least part of the method. Software may be stored on a physical medium or on a cloud-based storage solution or on any other suitable medium.

The controller may be retrofit to an existing floating wind turbine. This may be achieved by providing the existing floating wind turbine with the additional input(s), the additional sensor(s) and/or additional or updated code/software. For instance the existing floating wind turbine may comprise the standard controller, and the active damping controller may be added to the standard controller to result in the motion controller of the present invention.

The active damping controller may be code that is used to provide one or more additional blade pitch adjustments that can be used to damp the surge motion.

Viewed from a fourth aspect, the invention provides a computer program product comprising instructions that, when executed on processing circuitry for a floating wind turbine, will configure the processing circuitry to control a blade pitch for one or more rotors of the floating wind turbine, the instructions comprising: adjusting the blade pitch of each rotor blade when the wind turbine is operating in wind speeds below the rated wind speed so as to create a net force that damps a surge motion of the floating wind turbine.

The computer program product of the fourth aspect may be provided in the controller of the first aspect and/or the floating wind turbine of the second aspect.

The computer program product of the fourth aspect may be used to perform the method of the third aspect. In other words, the computer program product may comprise instructions that, when executed on processing circuitry for a floating wind turbine, will configure the processing circuitry to perform the method of the third aspect.

BRIEF DESCRIPTION OF THE DRAWINGS

Certain embodiments will now be described by way of example only and with reference to the accompanying drawings in which.

DETAILED DESCRIPTION

Figure 1:
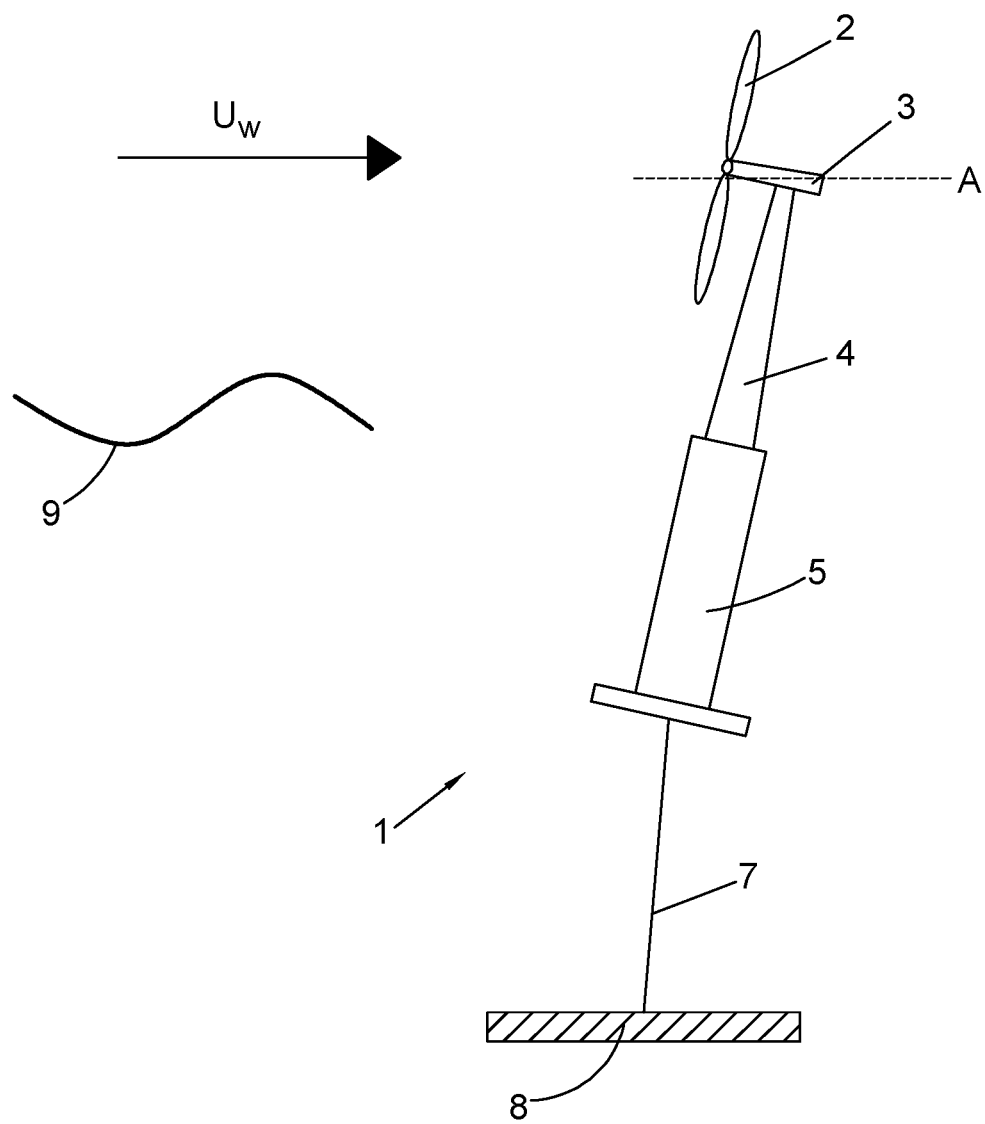
FIG. 1 shows a floating wind turbine.

Turning to FIG. 1, there is illustrated a floating wind turbine assembly 1. It comprises a turbine rotor 2 mounted to a nacelle 3. The nacelle is in turn mounted to the top of a structure which comprises a tower 4 secured to the top of a floating body 5, which in the example shown is a spar-buoy like structure. The disclosed principles of controlling surge motion are applicable to all floating structures for floating wind turbines. The floating body is secured to the sea bed by one or more anchor lines 7 (only one is shown), these could be taut or catenery mooring lines. The nacelle contains an electrical generator that is connected to the turbine rotor by any known means such as a reduction gearbox, by direct connection to the electrical generator or hydraulic transmission etc. (these items are not shown). The nacelle also contains a control unit.

The floating wind turbine is subject to incoming wind $U_W$ forces and wave 9 forces. (The waves 9 on the water's surface are shown schematically.) These forces will cause the floating wind turbine assembly 1 to move about in the water. Movement in the axial direction (i.e. axial relative to axis A of the rotor) is referred to as surge motion.

The controller in the nacelle is arranged to control a blade pitch of the rotor blades 2. In conventional controllers (e.g. the standard controller depicted in FIG. 2), when the wind turbine is operating in winds below the rated wind speed, the blade pitch is approximately constant at an angle that produces maximum power. In a controller according to the present invention, when the wind turbine is operating in winds below the rated wind speed the blade pitch is adjusted in order to damp the surge motion of the floating wind turbine.

Figure 2:
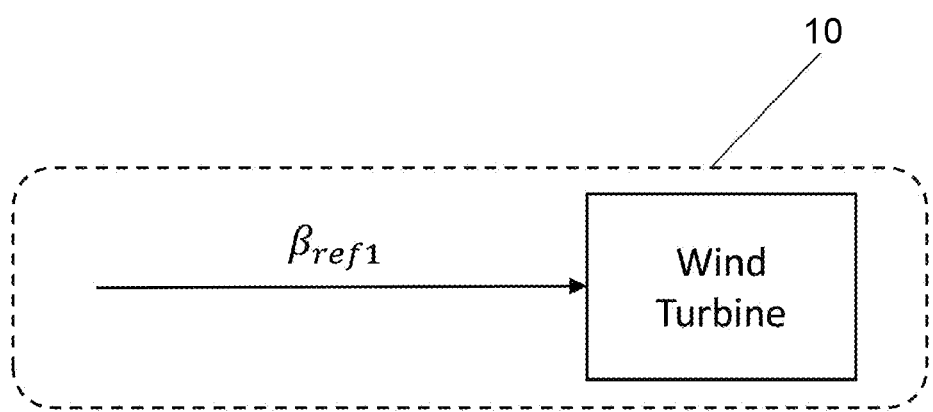
FIG. 2 is a block diagram of a conventional controller for a floating wind turbine.

FIG. 2 illustrates a conventional blade pitch controller 10 for a floating wind turbine. The standard blade pitch controller 10 is particularly for controlling the pitch of the blades of the floating wind turbine when the wind speed is below the rated wind speed.

When the wind speed is below the rated wind speed, the standard blade pitch controller 10 holds the pitch of the blades at an approximately constant angle according to an original blade pitch signal $\beta_{ref1}$. The pitch of the blades corresponding to the original blade pitch signal $\beta_{ref1}$ is typically selected to maximise the power extracted at wind speeds below the rated wind speed, and can be determined according to known methods. The standard blade pitch controller 10 does not account for any motions of the wind turbine structure itself, however.

Figure 3:
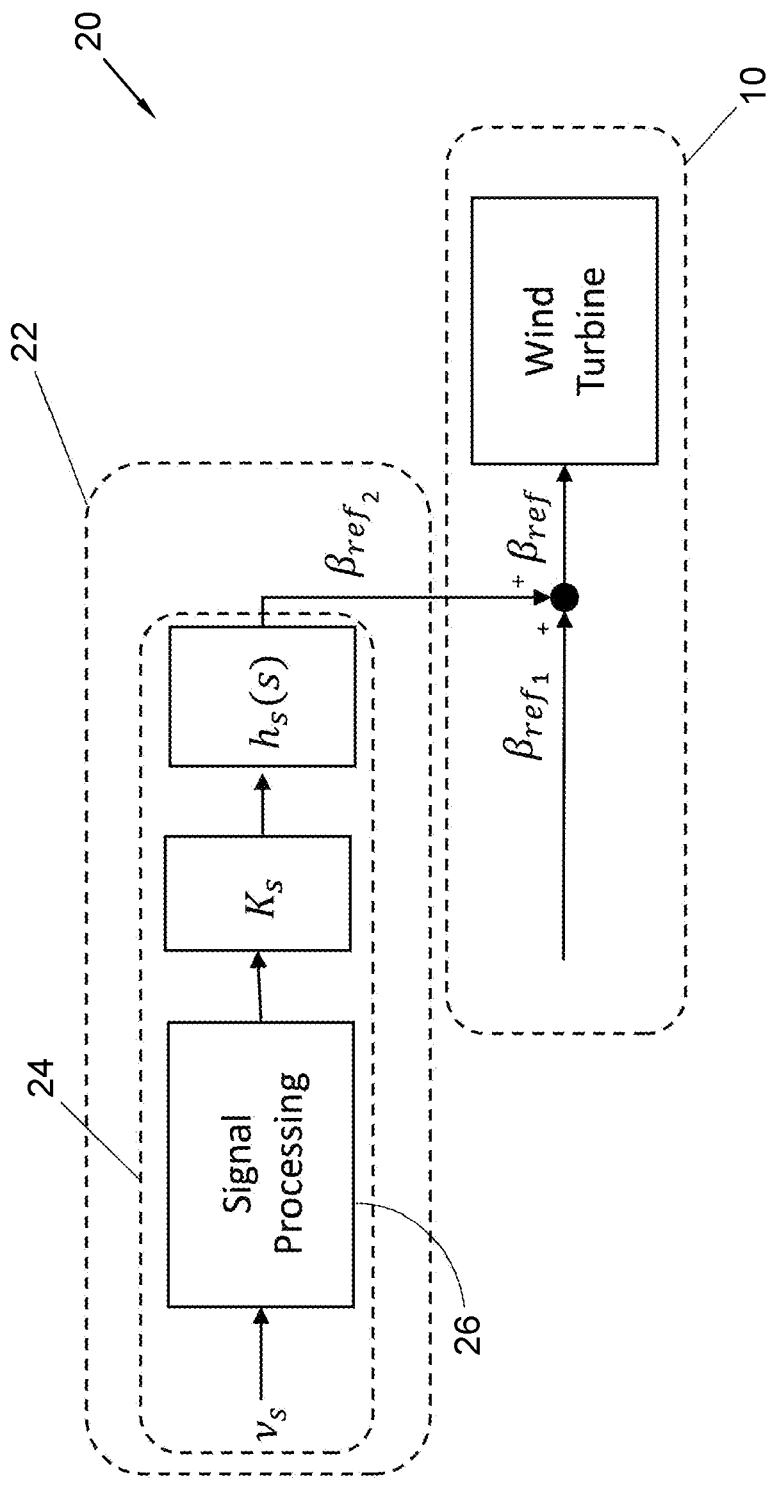
FIG. 3 is a block diagram of a controller for a floating wind turbine with active surge damping control according to an embodiment of the invention.

FIG. 3 illustrates a motion controller 20 for a floating wind turbine according to an embodiment of the present invention. The motion controller 20 can account for surge motion that the floating wind turbine may undergo. The motion controller 20 comprises an active damping controller 22 for calculating an additional blade pitch adjustment signal $\beta_{ref2}$ for damping the surge motion. The active damping controller 22 is coupled to a standard blade pitch controller, e.g. the standard blade pitch controller 10 of FIG. 2.

The active damping controller 22 comprises an active damping control loop 24 for calculating the additional blade pitch adjustment signal $\beta_{ref2}$ for damping the rigid body surge motions of the wind turbine. The damping control loop 24 comprises a signal processing block 26, an active damping controller gain $K_s$, and a controller transfer function $h_s(s)$.

Operation of the motion controller 20 occurs as follows. The standard blade pitch controller 10 receives or produces an original blade pitch signal $\beta_{ref1}$. In the present embodiment, the original blade pitch signal $\beta_{ref1}$ corresponds to an approximately constant angle or pitch of the rotor blades while the wind speed is below rated wind speed. In modified embodiments, the original blade pitch signal $\beta_{ref1}$ may not be constant and may include other adjustment signals.

In the active damping control loop 24, a measured or estimated surge velocity of the wind turbine vs (which may also be referred to as $x_s$) is processed by the signal processing means 26 and is then operated on by the active damping controller gain $K_s$ and the controller transfer function $h_s(s)$. This produces the additional blade pitch adjustment signal $\beta_{ref2}$.

The additional blade pitch adjustment signal $\beta_{ref2}$ is then added to the original blade pitch signal $\beta_{ref1}$ to produce a total blade pitch adjustment signal $\beta_{ref}$ which is used to control the blades of the wind turbine so as to damp the surge motion while maximising power extraction. This reduces the forces on the wind turbine structure and mooring system whilst maximising power output for the given wind speed.

The signal processing block 26 uses a sharp low pass filter with a filter frequency that is sufficiently below the wave frequency range (0.05 to 0.2 Hz) in order to avoid damping of wave induced motion, which would lead to bad performance with respect to key wind turbine parameters. The filter frequency may depend on the natural surge frequency of the floating wind turbine. It may be around 0.004 to 0.017 Hz.

The value of the active damping controller gain $K_s$ will be tailored depending on the frequencies of the surge motion being damped. The exact value that is used for this parameter may be found by conventional controller tuning.

Figure 4:
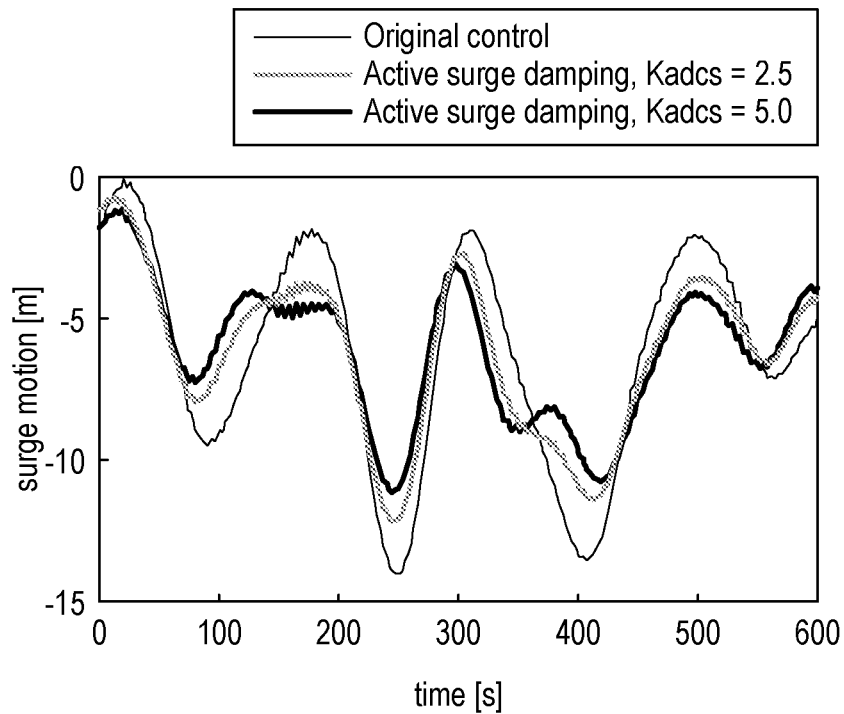
FIGS. 4 and 5 are graphs showing results from a simulation comparing a floating wind turbine having a controller without active surge damping with a floating wind turbine having a controller with active surge damping control.
Figure 5:
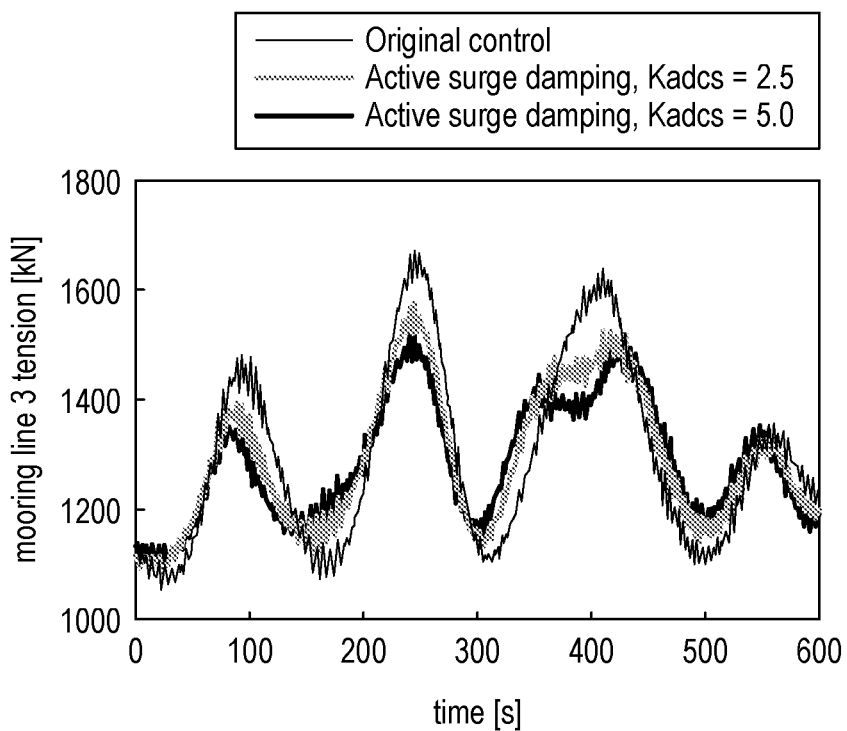

FIGS. 4 and 5 show the results of a simulation to help illustrate the benefits of active wind turbine control below the rated wind speed that accounts for surge motion. FIG. 4 shows the surge motions for a floating wind turbine with and without active surge damping control for wind speeds below the rated wind speed. FIG. 5 shows the mooring line tension in the highest loaded mooring line from the same simulation. The simulation compares a scenario where the floating wind turbine uses a standard blade pitch controller with no active damping (e.g. the blade pitch controller of FIG. 2) with two scenarios where the floating wind turbine uses a motion controller with active damping for surge motion (e.g. the blade pitch controller of FIG. 3) with different active damping control values. It is seen from FIG. 4 that the surge motion response is reduced when active surge damping control is applied in accordance with the present invention. Further, as shown in FIG. 5, a corresponding reduction in tension variations in the main mooring line is seen when active surge damping control is applied.

In this simulation, a 12 MW floating wind turbine with an asymmetric mooring layout was modelled. FIGS. 4 and 5 depict a snapshot of the simulation between 0 and 600 seconds, where the total length of the simulation was 3700 seconds. Parameters of the simulation included that the mean wind speed was 8.5 ms-1, there was a turbulence class C, significant wave heights were set to 1.3 m, and the characteristic peak period was 6.3 s. The surge velocity measurement used by the controller was modelled as the average velocity between two DGPS measurements with 1 Hz resolution.

The fatigue damage in the main mooring lines and tower bottom was also calculated for the two active surge damping controller settings relative to the fatigue damage for the original control system for the case considered. For the extent of the 3700 second simulation for this particular set of parameter values, it was found that the relative fatigue damage in the highest loaded mooring line (3) is reduced to a factor 0.59-0.73 while the relative fatigue damage in the tower bottom is reduced to a factor 0.82-0.84, depending on active damping controller settings.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

I claim:

1. A motion controller for a floating wind turbine comprising a plurality of rotor blades, wherein the motion controller is arranged to adjust the blade pitch of each rotor blade when the floating wind turbine is operating in winds below the rated wind speed so as to create a net force that damps a surge motion of the floating wind turbine, wherein:
    the controller is arranged to calculate the blade pitch adjustment of one or more of the rotor blades based on an input of the surge motion;
    the input of surge motion is based on a measurement and/or estimation of the surge velocity of the floating wind turbine; and
    the blade pitch adjustment is directly proportional to the surge velocity.

2. A motion controller as claimed in claim 1, wherein the controller is arranged to adjust the blade pitch of each rotor blade with a phase relative to the floating wind turbine surge velocity so as to provide the damping force.

3. A motion controller as claimed in claim 1, wherein the input of the surge motion is measured and/or estimated using the output from one or more sensors.

4. A motion controller as claimed in claim 1, wherein the controller is configured to use a low pass filter on the input.

5. A motion controller as claimed in claim 4, wherein the low pass filter comprises a transfer function.

6. A motion controller as claimed in claim 4, wherein the low pass filter is arranged to filter out frequencies above 0.017 Hz.

7. A floating wind turbine comprising a rotor with a plurality of rotor blades, and the motion controller of claim 1.

8. A method of controlling a floating wind turbine comprising a plurality of rotor blades, the method comprising:
    inputting to the controller an input of the surge motion of the floating wind turbine;
    adjusting the blade pitch of each rotor blade based on the input of the surge motion when the wind turbine is operating in wind speeds below the rated wind speed so as to create a net force that damps a surge motion of the floating wind turbine, wherein:
    the input of surge motion is based on a measurement and/or estimation of the surge velocity of the floating wind turbine; and
    the blade pitch adjustment is directly proportional to the surge velocity.

9. A method as claimed in claim 8, the method comprising adjusting the blade pitch of each rotor blade with a phase relative to the floating wind turbine surge velocity so as to provide the damping force.

10. A method as claimed in claim 8, wherein the input of the motion is measured and/or estimated using the output from one or more sensors.

11. A method as claimed in claim 10, wherein the one or more sensors comprise a motion sensor and/or a global positioning sensor.

12. A method as claimed in claim 8, the method comprising using a low pass filter on the input.

13. A method as claimed in claim 12, wherein the low pass filter comprises a transfer function.

14. A method as claimed in claim 12, wherein the low pass filter filters out frequencies above 0.017 Hz.

15. A method as claimed in claim 8, wherein the method is performed using a motion controller, wherein the motion controller is arranged to adjust the blade pitch of each rotor blade when the floating wind turbine is operating in winds below the rated wind speed so as to create a net force that damps a surge motion of the floating wind turbine.

16. A non-transitory computer readable medium, comprising instructions that, when executed on processing circuitry for a floating wind turbine, will configure the processing circuitry to perform the method of claim 8.

* * * * *